United States Patent [19]

Sasaki et al.

[11] Patent Number: 4,942,024

[45] Date of Patent: Jul. 17, 1990

[54] METHOD FOR REFINING HYDROXIDES OF NIOBIUM AND TANTALUM CONTAINING TRANSITION METALS

[75] Inventors: Hiromi Sasaki; Tadasi Tanaka; Yasusi Muneno, all of Ube, Japan

[73] Assignee: Central Glass Company, Limited, Ube, Japan

[21] Appl. No.: 364,081

[22] Filed: Jun. 2, 1989

[30] Foreign Application Priority Data

Jun. 13, 1988 [JP] Japan .................................. 63-143618

[51] Int. Cl.$^5$ ........................ C01G 33/00; C01G 35/00
[52] U.S. Cl. ........................................ 423/65; 423/67; 423/68; 423/56; 423/81; 423/143; 423/42; 423/50; 423/92
[58] Field of Search .................... 423/65, 67, 68, 62, 423/143, 56, 81, 42, 50, 92; 75/108, 121, 117, 119, 120

[56] References Cited

U.S. PATENT DOCUMENTS

| | | | |
|---|---|---|---|
| 4,465,593 | 8/1984 | Wemhoff | 210/203 |
| 4,490,340 | 12/1984 | Ritsko | 423/65 |
| 4,495,158 | 1/1985 | Ritsko | 423/65 |

FOREIGN PATENT DOCUMENTS

| | | |
|---|---|---|
| 38-13607 | 1/1963 | Japan . |
| 38-18061 | 1/1963 | Japan . |
| 56-114831 | 9/1981 | Japan . |

*Primary Examiner*—Robert L. Stoll
*Assistant Examiner*—Steven J. Bos
*Attorney, Agent, or Firm*—Fleit, Jacobson, Cohn, Price, Holman & Stern

[57] ABSTRACT

Refining of either niobium hydroxide or tantalum hydroxide containing transition metals as impurities is accomplished easily and economically by dissolving the metal hydroxide in an aqueous solution of either hydrofluoric acid or oxalic acid, adjusting the pH of the solution to 1 to 4 and adding ammonium pyrrolidinedithiocarbamate (APDC) to the solution while maintaining the temperature of the solution below 60° C. The addition of APDC causes the transition metals to simultaneously precipitate as coordination compounds. The minimum amount of APDC is 0.05 wt % of $Nb_2O_5$ or $Ta_2O_5$ that can be formed from Nb or Ta contained in the solution. After the treatment with APDC the pH of the solution is raised to 6 or above to precipitate the refined metal hydroxide.

4 Claims, No Drawings

METHOD FOR REFINING HYDROXIDES OF NIOBIUM AND TANTALUM CONTAINING TRANSITION METALS

BACKGROUND OF THE INVENTION

This invention relates to a method of refining hydroxide of niobium or tantalum containing transition metals as impurities by treatment of a solution of the crude hydroxide with a specially selected reagent.

Recently niobium and tantalum and their carbides have been used in the manufacture of optical devices and electronic devices, and usually oxides of neobium and tantalum are used as the raw materials of the metals and carbides. Therefore, there is an increasing demand for niobium oxide and tantalum oxide of very high purity.

Usually oxides of niobium and tantalum are prepared from hydroxides of niobium and tantalum, respectively. That is, oxide of niobium or tantalum is prepared by the steps of decomposing an ore containing the metal by a known process using suitable acids such as sulfuric acid and hydrofluoric acid and performing solvent extraction to obtain a solution of a niobium or tantalum fluoride complex, adding a suitable alkali such as ammonia to the solution to precipitate hydroxide of the metal, and drying and firing the precipitated hydroxide.

However, hydroxide of niobium or tantalum obtained by the above process contains considerable amounts of impurities including various transition metals, and most of the impurity metals remain in the metal oxide obtained from the hydroxide. As a raw material for optical or electronic devices, the metal oxide is required to be very low in the contents of transition metals. To meet the requirement it is necessary to take a special measure for enhancement of the purity of the hydroxide prepared by the above described process. For example, it is necessary to remove metal impurities from the metal fluoride complex solution before precipitating the metal hydroxide by performing solvent extraction or ion exchange treatment (e.g., JP No. 38-13607, JP No. 38-18061, JP No. 56-114831). However, the inclusion of such a purification operation renders the hydroxide preparing process complicated and raises the cost of production.

SUMMARY OF THE INVENTION

It is an object of the present invention to provide a method of easily and economically refining hydroxides of niobium and tantalum containing transition metals.

According to the invention there is provided a method of refining niobium hydroxide or tantalum hydroxide containing transition metals, the method comprising the steps of dissolving the metal hydroxide in an aqueous solution of either hydrofluoric acid or oxalic acid, adjusting the pH of the obtained solution to 1 to 4 and maintaining the temperature of the solution not higher than 60° C., then adding ammonium pyrrolidinedithiocarbamate (hereinafter abbreviated to APDC) to the solution such that APDC amounts to at least 0.05 wt. % of $Nb_2O_5$ or $Ta_2O_5$ to be formed from Nb or Ta contained in the solution to thereby form a precipitate containing transition metals, removing the precipitate, and then raising the pH of the solution to a value not lower than 6 to cause precipitationo if refined hydroxide of niobium or tantalum.

The principal feature of the invention is using APDC as the sole reagent for treatment of the solution of niobium or tantalum hydroxide to remove transition metals as precipitates. It is known that some compounds selectively combine with some transition metals as represented by dimethylglyoxime, cupherron and dithizone which selectively coordinate with Cu, Fe and Ni, respectively. However, when this knowledge is used for refining niobium or tantalum hydroxide containing many kinds of transition metals it is necessary to use many kinds of reagents jointly. In contrast, APDC combines with many kinds of transition metals form coordination compounds of the respective metals, and the coordination compounds have high stability constants. Accordingly, transition metals usually contained in niobium hydroxide and tantalum hydroxide, such as Fe, Co, Ni, Cr, Pb, Ti, Cu and Mn, can simultaneously be removed as precipitates.

APDC is availabel as an industrial material at a relatively low price, and the method of the invention is sinple and consists of easy operations. By this method it is possible to refine either of niobium hydroxide and tantalum hydroxide prepared by the usual processes, and it is easy to obtain either niobium hydroxide or tantalum hydroxide in which the content of any transition metal is far lower than 10 ppm. Accordingly, oxides of niobium and tantalum obtained from the hyroxides refined by this method are very useful as raw materials for optical and electronic devices.

Out discovery includes that the precipitation of the transition metals as coordination compounds can be accomplished also by using a dimethyldithiocarbamate such as sodium salt or potassium salt in place of APDC in the above described method, on condition that the pH of the hydroxide solution is made not lower than 3. However, when such a dimethyldithiocarbamate is used there is a strong possibility of intrusion of Na or K into the refined hydroxide of niobium or tantalum. Hence, this option can be employed only when the presence of a small amount of Na or K in the refined product is permissible.

DESCRIPTION OF THE PREFERRED EMBODIMENTS

In the method according to the invention crude niobium hydroxide or tantalium hydroxide prepared by a known process is dissolved in water by using either hydrofluoric acid or oxalic acid, and the pH of the aqueous solution is adjusted to a value in the range from 1 to 4 by using a suitable alkali such as aqueous ammonia. If APDC is added to the solution while the pH is below 1, the precipitation of coordination compounds of the impurity transition metals remains incomplete so that the degree of refining of the metal hydroxide becomes relatively low. When the pH of the solution is above 4, the precipitation of the transition metals is accompanied by precipitation of a portion of niobium or tantalum hydroxide so that the yield of refined hydroxide lowers.

The amount of addition of APDC to the aqueous solution depends on the contents of transition metals in the crude metal hydroxide. For substantially complete removal of the transition metals the molar ratio of APDC to the total of the transition metals needs to be at least 10:1. There is no defininte upper limit to the proportion of APDC, but it is unfavorable from an economical point of view to increase the aforementioned molar ratio to more than about 100:1. In practice it is troublesome to determine the contents of transition metals in the crude metal hydroxide, and considering the purities of niobium hydroxide and tantalum hydroxide industrially prepared by usual processes it suffices to specify the minimum amount of the addition of APDC on the basis of the quantity of $Nb_2O_5$ or $Ta_2O_5$ to be formed from Nb or Ta contained in the aqueous solution. In this regard, it is necessary that APDC added to the solution amounts to at least 0.05 wt % of $Nb_2O_5$ or $Ta_2O_5$ to be formed from Nb or Ta contained in the solution.

In adding APDC to the solution of the metal hydroxide it is optional whether to directly add a powder of APDC to the solution or to add an aqueous solution of APDC. At the time of addition of APDC, the solution must be maintained at a temperature not higher than 60° C., and preferably not higher than 40° C. If the temperature of the solution is above 60° C. there occurs decomposition of a portion of APDC added to the solution, whereby the effect of the addition of APDC becomes insufficient.

After the addition of a suitable quantity of APDC it is desirable to continue stirring of the solution for some time for completion of the precipitation of transition metal compounds and also for aging of the precipitates. After that the pH of the solution is raised to a value not lower than 6 by using a suitable alkali such as aqueous ammonia to thereby precipitate niobium hydroxide or tantalum hydroxide from the solution. If the pH of the solution does not reach 6 the precipitation of the metal hydroxide remains incomplete so that the yield of the refined metal hydroxide becomes low.

The invention is further illustrated by the following nonlimitative examples.

EXAMPLE 1

In a Teflon beaker, 125 g of crude niobium hydroxide (the content of Nb was such that $Nb_2O_5$ formed by firing the crude hydroxide amounted to 42 wt % of the crude hydroxide) was dispersed in 100 g of purified water. Then 50 g of 55% hydrofluoric acid was added to the aqueous dispersion to dissolve niobium hydroxide, and aqueous ammonia was added to the resultant solution to adjust the pH of the solution to 3. After that the solution was maintained at 30° C., and APDC was added to the solution so as to amount to 0.5 wt % of $Nb_2O_5$ to be theoretically formed from niobium contained in the solution. Thereafter the solution was stirred for 30 min for aging of precipitates formed by the treatment with APDC, and the precipitates were filtered out. The pH of the filtrate was adjusted to 8 by adding aqueous ammonia to thereby cause precipitation of niobium hydroxide. The precipitate was recovered by filtration and dried.

Analysis of the crude niobium hydroxide and the refined niobium hydroxide gave the results shown in Table 1, wherein the content of each impurity metal element in each sample refers to the proportion of the metal element to $Nb_2O_5$ theoretically formed from Nb contained in the sample.

COMPARATIVE EXAMPLE 1

The entire process of Example 1 was repeated except that the temperature of the niobium hydroxide solution was maintained at 70° C. during the treatment with APDC. The result of analysis of the refined sample is shown in Table 1.

EXAMPLE 2

The process of Example 1 was repeated by using the same materials except that 84 g of oxalic acid dihydrate was used in place of hydrofluoric acid to dissolve the unrefined niobium hydroxide. The result of analysis of the refined sample is shown in Table 1.

COMPARATIVE EXAMPLE 2

The process of Example 2 was repeated except that the temperature of the niobium hydroxide solution was maintained at 70° C. during the treatment with APDC. The result of analysis of the refined sample is shown in Table 1.

TABLE 1

| Crude Sample | Transition Metals in Niobium Hydroxide (ppm) | | | | | | | |
| --- | --- | --- | --- | --- | --- | --- | --- | --- |
| | Fe | Ni | Co | Cr | Pb | Ti | Cu | Mn |
| | 320 | 20 | 25 | 52 | 61 | 34 | 29 | 38 |
| Product of Example 1 | 1 | 2 | 2 | 1 | 3 | 5 | 2 | 4 |
| Product of Comp. Ex. 1 | 151 | 20 | 19 | 32 | 56 | 24 | 19 | 22 |
| Product of Example 2 | 1 | 2 | 2 | 2 | 3 | 1 | 2 | 1 |
| Product of Comp. Ex. 2 | 210 | 19 | 21 | 41 | 53 | 26 | 21 | 29 |

EXAMPLES 3 AND 4

In both Examples 3 and 4, 105 g of crude tantalum hydroxide was treated with APDC amounting to 0.5 wt % of $Ta_2O_5$ that could be formed from Ta contained in the crude tantalum hydroxide subjected to treatment. In the crude hydroxide the content of Ta was such that $Ta_2O_5$ formed by firing the crude hydroxide amounted to 50 wt % of the crude hydroxide. That is, the quantity of $Ta_2O_5$ formed from 105 g of the crude hydroxide was equivalent to the quantity of $Nb_2O_5$ formed from the crude niobium hydroxide treated in Example 1.

Except the change in the compound to be refined, the process of Example 1 (using hydrofluoric acid) was repeated in Example 3 and the process of Example 2 (using oxalic acid dihydrate) in Example 4. Analysis of the crude tantalum hydroxide and the products of Examples 3 and 4 gave the results shown in Table 2, wherein the content of each impurity metal element in each sample refers to the proportion of the metal element to $Ta_2O_5$ that could be formed from Ta contained in the sample.

COMPARATIVE EXAMPLES 3 AND 4

The process of Example 3 and the process of Example 4 were repeated in Comparative Examaples 3 and 4, respectively, except that the amount of addition of APDC was decreased to 0.01 wt % of $Ta_2O_5$ to be formed from Ta contained in the crude sample. The analytical results are shown in Table 2.

TABLE 2

| Crude Sample | Transition Metals in Tantalum Hydroxide (ppm) | | | | | | | |
| --- | --- | --- | --- | --- | --- | --- | --- | --- |
| | Fe | Ni | Co | Cr | Pb | Ti | Cu | Mn |
| | 270 | 37 | 28 | 31 | 55 | 38 | 42 | 32 |
| Product of Example 3 | 1 | 2 | 1 | 1 | 4 | 2 | 1 | 5 |
| Product of Comp. Ex. 3 | 192 | 29 | 21 | 19 | 42 | 19 | 32 | 28 |
| Product of Example 4 | 1 | 1 | 2 | 2 | 4 | 3 | 2 | 4 |
| Product of | 193 | 19 | 22 | 18 | 43 | 23 | 29 | 27 |

TABLE 2-continued

| Crude Sample | Transition Metals in Tantalum Hydroxide (ppm) | | | | | | | |
|---|---|---|---|---|---|---|---|---|
| | Fe | Ni | Co | Cr | Pb | Ti | Cu | Mn |
| | 270 | 37 | 28 | 31 | 55 | 38 | 42 | 32 |
| Comp. Ex. 4 | | | | | | | | |

EXAMPLES 5 AND 6

The process of Example 1 (using hydrofluoric acid) and the process of Example 2 (using oxalic acid dihydrate) were repeated in Examples 5 and 6, respectively, except that in each case the pH of the niobium hyroxide solution was adjusted to 1 in preparation for the addition of APDC. The analytical results are shown in Table 3.

COMPARATIVE EXAMPLES 5 AND 6

The process of Example 1 and the process of Example 2 were repeated in Comparative Examples 5 and 6, respectively, except that in each case the pH of the niobium hydroxide solution was adjusted to 5 in preparation for the addition of APDC. The analytical results are shown in Table 3.

In each of Examples 5 and 6 and Comparatiev Examples 5 and 6, the amount of recovery of niobium was measured by firing the refined product at 800° C. for 1 hr and comparing the weight of the obtained oxide with the weight of oxide obtained by firing 125 g of the crude niobium hydroxide under the same conditions. That is, the amount of recovery, P (%), was given by $P = W_2/W_1 \times 100$, where $W_1$ is the weight of the oxide obtained from 125 g of the crude niobium hydroxide and $W_2$ is the weight of the refined product.

TABLE 3

| Crude Sample | Transition Metals in Niobium Hydroxide (ppm) | | | | | | | | Recovery of Nb (%) |
|---|---|---|---|---|---|---|---|---|---|
| | Fe | Ni | Co | Cr | Pb | Ti | Cu | Mn | |
| | 320 | 20 | 25 | 52 | 61 | 34 | 29 | 38 | |
| Product of Example 5 | 1 | 3 | 2 | 1 | 4 | 5 | 2 | 5 | 98 |
| Product of Comp. Ex. 5 | 3 | 2 | 3 | 2 | 3 | 5 | 2 | 5 | 85 |
| Product of Example 6 | 1 | 1 | 2 | 2 | 4 | 3 | 2 | 4 | 99 |
| Product of Comp. Ex. 6 | 2 | 3 | 5 | 3 | 4 | 3 | 2 | 4 | 87 |

What is claimed is:

1. A method of refining hydroxide of a metal of Group V selected from the group consisting of niobium and tantalum, the metal hydroxide containing transition metals as impurities, the method comprising the steps of:
    (a) dissolving the metal hydroxide in an aqueous solution of an acid selected from the group consisting of hydrofluoric acid and oxalic acid;
    (b) adjusting the pH of the aqueous solution of the metal hydroxide to a value in the range from 1 to 4;
    (c) after step (b) maintaining the temperature of the aqueous solution of the metal hydroxide not higher than 60° C. and adding ammonium pyrrolidinedithiocarbamate to the solution such that ammonium pyrrolidinedithiocarbamate amounts to at least 0.05 wt % of $M_2O_5$, where M represents said metal, that can be formed from the metal M contained in the solution to thereby form a precipitate containing transition metals;
    (d) removing said precipitate from the solution of the metal hydroxide; and
    (e) after step (d) raising the pH of the solution of the metal hydroxide to a value not lower than 6 to cause precipitation of refined metal hydroxide.

2. A method according to claim 1, wherein the temperature of the solution at step (c) is not higher than 40° C.

3. A method according to claim 1, wherein aqueous ammonia is added to the aqueous solution of the metal hydroxide at both steps (b) and (e) to adjust the pH of the solution.

4. A method according to claim 1, wherein the molar ratio of ammonium pyrrolidinedithiocarbamate added to the solution of the metal hydroxide at step (c) to the total of transition metals contained in the metal hydroxide is not lower than 10:1.

* * * * *